United States Patent
Peng

(10) Patent No.: US 9,720,543 B2
(45) Date of Patent: Aug. 1, 2017

(54) ARRAY SUBSTRATE, DISPLAY PANEL AND DISPLAY DEVICE

(71) Applicants: Xiamen Tianma Micro-Electronics Co., Ltd., Xiamen (CN); Tianma Micro-Electronics Co., Ltd., Shenzhen (CN)

(72) Inventor: Tao Peng, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 102 days.

(21) Appl. No.: 14/884,673

(22) Filed: Oct. 15, 2015

(65) Prior Publication Data
US 2016/0328074 A1    Nov. 10, 2016

(30) Foreign Application Priority Data
May 8, 2015    (CN) .......................... 2015 1 0232163

(51) Int. Cl.
*G06F 3/041* (2006.01)
*G06F 3/047* (2006.01)
*G09G 3/36* (2006.01)

(52) U.S. Cl.
CPC ............ *G06F 3/0416* (2013.01); *G06F 3/047* (2013.01); *G06F 2203/04103* (2013.01); *G09G 3/3607* (2013.01); *G09G 2300/0426* (2013.01)

(58) Field of Classification Search
CPC ......... G06F 2203/04103; G06F 3/0412; G06F 3/044; G06F 3/0416
See application file for complete search history.

(56) References Cited

U.S. PATENT DOCUMENTS

| | | | |
|---|---|---|---|
| 2011/0122084 A1* | 5/2011 | Jeon | G02F 1/13338 345/173 |
| 2013/0162570 A1 | 6/2013 | Shin et al. | |
| 2014/0168150 A1* | 6/2014 | Kim | G02F 1/136204 345/174 |
| 2015/0309644 A1* | 10/2015 | Sun | G06F 3/0412 345/173 |
| 2016/0202580 A1* | 7/2016 | Hong | G02F 1/136227 257/72 |

* cited by examiner

*Primary Examiner* — Gerald Johnson
(74) *Attorney, Agent, or Firm* — Faegre Baker Daniels LLP

(57) ABSTRACT

An array substrate, a display panel and a display device. The array substrate includes: a substrate; a plurality of scan lines and a plurality of data lines disposed on the substrate; a plurality of sub-pixels arranged in an array, which are defined by the data lines and the scan lines insulatedly intersecting the data lines; a plurality of touch sensing electrodes disposed in an array, each of which corresponds to one pixel region comprising a plurality of first sub-pixels and at least one second sub-pixel; and a plurality of first signal lines extending along a first direction, wherein, an area of a second sub-pixel electrode in the second sub-pixel is smaller than that of a first sub-pixel electrode in the first sub-pixel, and the first inactive display region is provided in the second sub-pixel.

20 Claims, 11 Drawing Sheets

ARRAY SUBSTRATE, DISPLAY PANEL AND DISPLAY DEVICE

CROSS-REFERENCE TO RELATED APPLICATION

This application claims priority to Chinese Application No. 201510232163.7, filed May 8, 2015, which is herein incorporated by reference in its entirety.

BACKGROUND

A Liquid Crystal Display (LCD) is a flat panel display. With the development of science and technology, electronic products containing the LCD are developed to be lightweight, thin, short and compact, and have advantages such as right-angle display, low power consumption, a small size, and to be free of radiation, which allow users to enjoy the best visual environment.

A display having a touch sensing function is derived from technology for function diversity. Generally, touch technology includes in-cell touch style and on-cell touch style. The in-cell touch style refers to incorporating a touch sensing structure into an array substrate or an opposite substrate in the display panel, while the on-cell touch style refers to embedding the touch sensing structure between a color filter substrate and a polarizing plate. The In-cell touch style makes the display lighter and thinner and thus arouses more attention.

SUMMARY

Embodiments of the disclosure provide an array substrate, a display panel and a display device. Because the touch sensing electrode lines need to electrically connect with the touch electrodes by bridging structures, the disclosure provides embodiments of the bridging structure, that increases a distance between the bridging structure and the pixel electrode so as to ensure good electrical insulation between the bridging structure and the pixel electrode adjacent to the bridging structure and reduce a probability of short circuit.

In a first example, embodiments of the disclosure provide an array substrate, including:
  a substrate;
  a plurality of scan lines and a plurality of data lines disposed on the substrate;
  a plurality of sub-pixels arranged in an array, which are defined by the data lines and the scan lines insulatedly intersecting the data lines;
  a plurality of touch sensing electrodes disposed in an array, each of which corresponds to one pixel region comprising a plurality of first sub-pixels and at least one second sub-pixel; and
  a plurality of first signal lines extending along a first direction, with each of the touch sensing electrodes being electrically connected with at least one of the first signal lines by a first bridging structure disposed in a first inactive display region,
  wherein, an area of a second sub-pixel electrode in the second sub-pixel is smaller than that of a first sub-pixel electrode in the first sub-pixel, and the first inactive display region is provided in the second sub-pixel.

In a second example, embodiments of the disclosure provide a display panel, including the array substrate of any of the embodiments described above.

In a third example, embodiments of the disclosure provide a display device, including the display panel described above.

In the disclosure, the first sub-pixel and the second sub-pixel are different from each other and provided in the array substrate, where the area of the second sub-pixel electrode in the second sub-pixel is smaller than that of the first sub-pixel electrode in the first sub-pixel, the first inactive display region is provided in the second sub-pixel (which includes the second sub-pixel electrode having a smaller area), and the first bridging structure for electrically connecting the touch sensing electrode with the first signal line is provided within the first inactive display region. In this way, embodiments can increase the space between the bridging structure and the pixel electrodes, which reduces the probability of short circuit and improves yield.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

Figure 1:
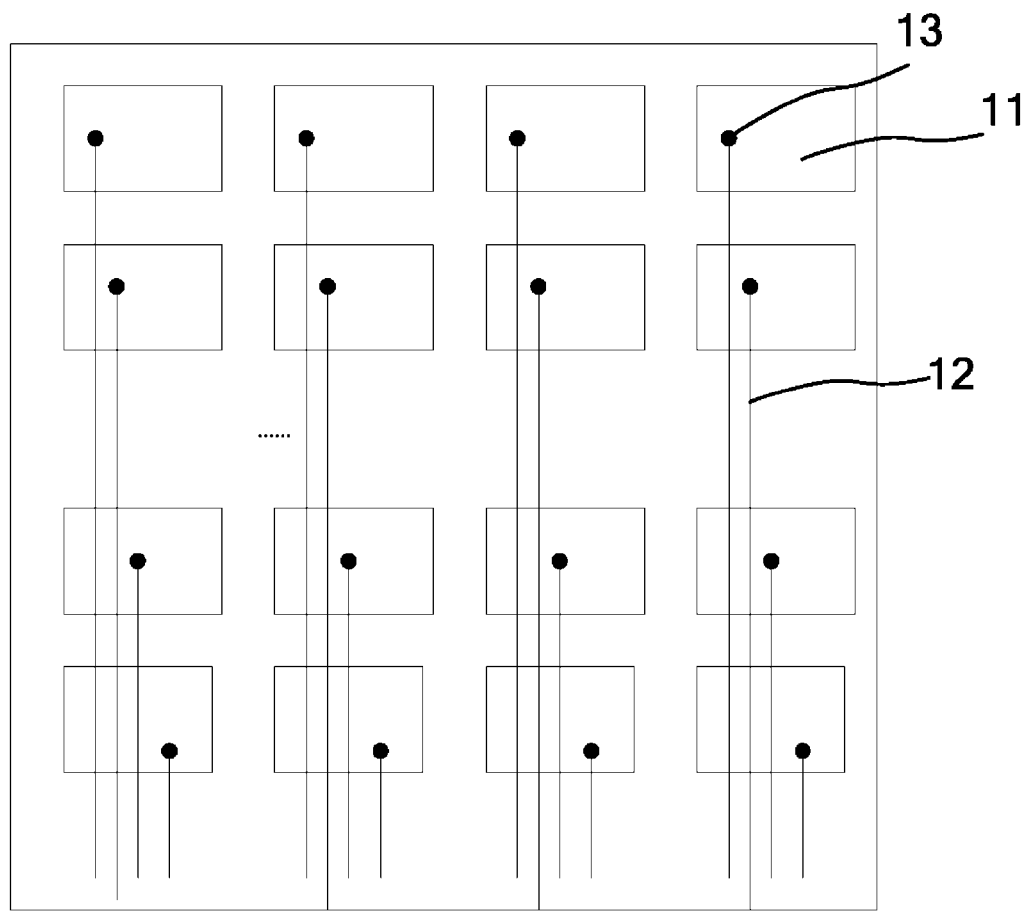
FIG. 1 is a schematic diagram showing an array substrate having a touch function provided in the related art.

While the disclosure is amenable to various modifications and alternative forms, embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

The disclosure is described in detail below with reference to the drawings. It may be understood that specific embodiments described herein are merely for explaining the disclosure rather than limiting the disclosure. In addition, it should be illustrated that merely partial content associated with the disclosure rather than all possible content is illustrated in the accompanying drawings for ease of description.

Wiring of touch sensing electrode lines according to the in-cell touch technology in the related art are shown in FIG. 1, in which touch sensing electrodes 11 are reused as (i.e. operable as) a common electrode, and touch sensing electrode lines 12 are generally connected electrically with the touch sensing electrodes 11 by vias 13.

In this disclosure, there are first sub-pixels and second sub-pixels that are different from each other and provided in the array substrate, where the area of the second sub-pixel electrode in the second sub-pixel is smaller than that of the first sub-pixel electrode in the first sub-pixel, the first inactive display region is provided in the second sub-pixel (which includes the second sub-pixel electrode having a smaller area), and the first bridging structure for electrically connecting the touch sensing electrode with the first signal line is provided within the first inactive display region.

Figure 2A:
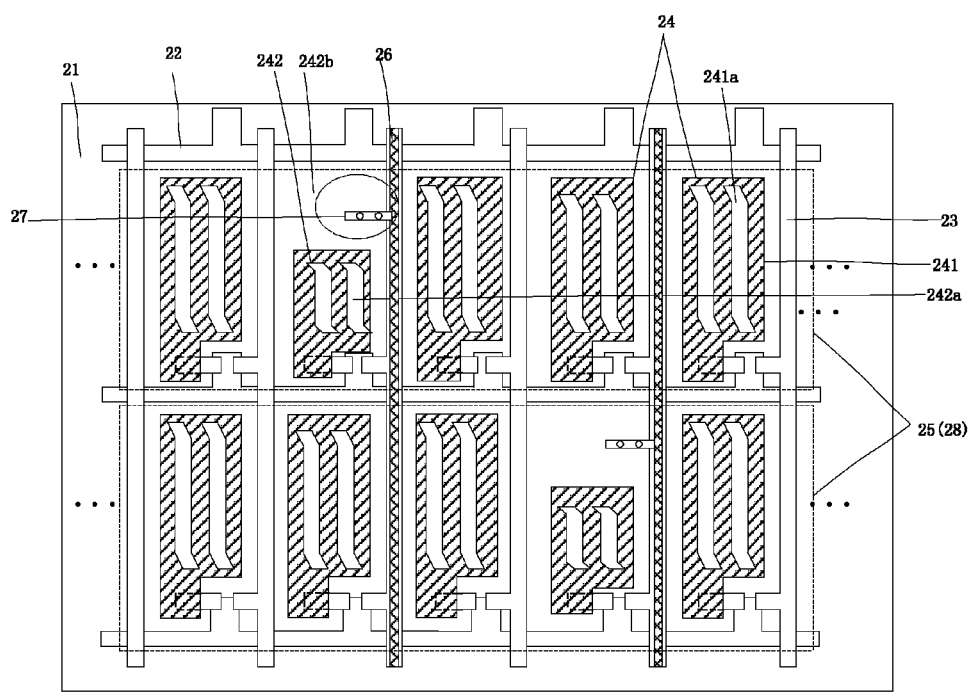
FIG. 2A is a schematic diagram showing the structure of an array substrate, according to embodiments of the disclosure.
Figure 2B:
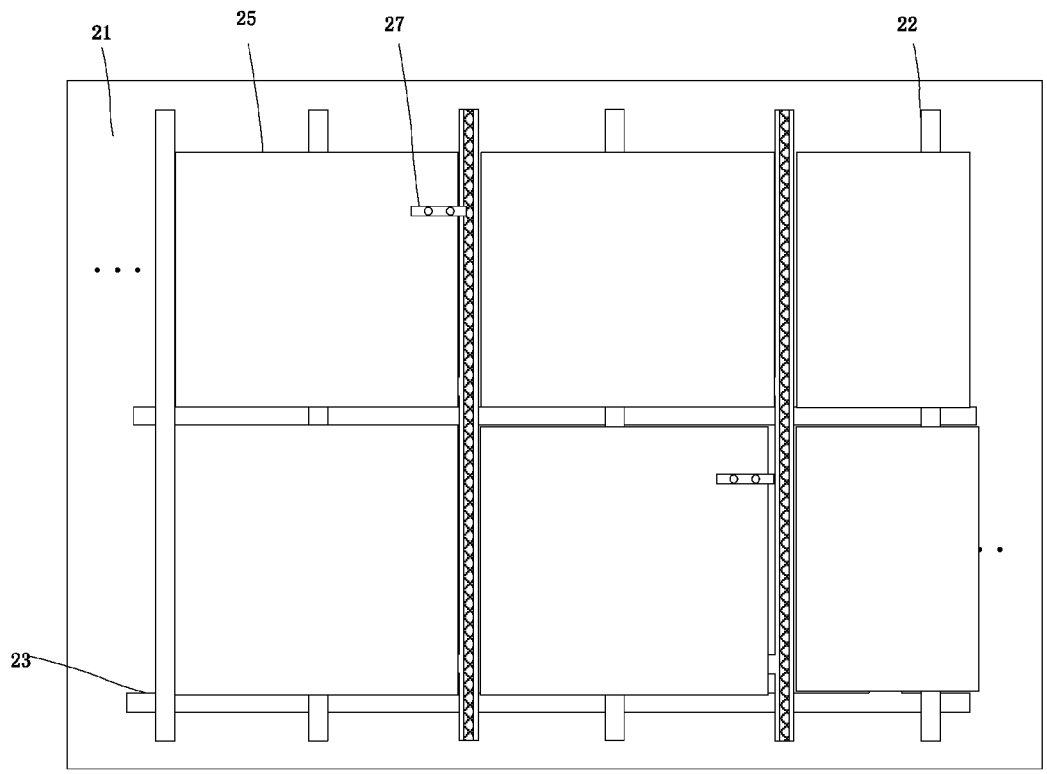
FIG. 2B is a schematic diagram showing the distribution of touch sensing electrodes of the array substrate, according to embodiments of the disclosure.

With reference to both FIGS. 2A and 2B, embodiment of the disclosure provide an array substrate.

As shown in FIG. 2A, the array substrate includes: a substrate 21; a plurality of scan lines 22 and a plurality of data lines 23 disposed on the substrate 21; and a plurality of sub-pixels 24 arranged in an array, which are defined by the scan lines 22 and the data lines 23 insulatedly intersecting the scan lines 22.

For example, to manufacture the array substrate, a metal layer is formed on the substrate 21 as a first metal layer (for example, the metal layer is made of aluminum, copper or molybdenum), and the plurality of scan lines 22 are formed by patterning the first metal layer; then an insulation layer (for example, which is made of silicon nitride and/or silicon oxide) is formed on the array substrate on which the scan lines 22 are already formed, another metal layer is formed on the insulation layer as a second metal layer, and the plurality of data lines 23 are formed by patterning the second metal layer. The data lines 23 are extended along a first direction, the scan lines 22 are extended along a second direction intersecting the first direction, and the scan lines 22 are electrically insulated from the data lines 23 by the insulation layer, so that the plurality of sub-pixels 24 arranged in an array are defined by insulatedly intersecting the scan lines 22 with the data lines 23.

Figure 2C:
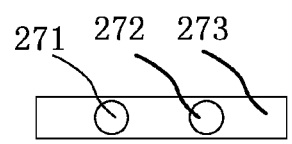
FIG. 2C is a top view showing a bridging structure of the array substrate, according to embodiments of the disclosure.
Figure 2D:
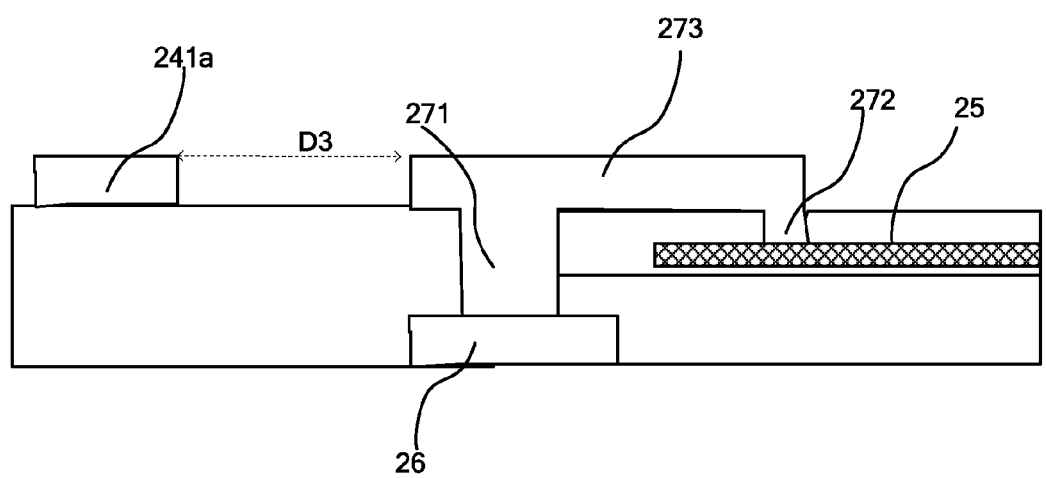
FIG. 2D is a cross-sectional view showing the bridging structure of the array substrate, according to embodiments of the disclosure.

Subsequently, a first transparent electrode layer made of a transparent conductive material such as Indium Tin Oxide (ITO) is formed on the data lines 23 to constitute a common electrode 28, as indicated by dashed blocks in FIG. 2A. The common electrode 28 is divided by using an etching process, for example, into unit blocks having the same size. When the array substrate operates in a display phase, the unit blocks operate as touch sensing electrodes 25 arranged in an array, as shown in FIG. 2B, and each touch sensing electrode 25 corresponds to one pixel region including a plurality of first sub-pixels 241 and at least one second sub-pixel 242, where an area of a second sub-pixel electrode 242a in the second sub-pixel 242 is smaller than that of a first sub-pixel electrode 241a in the first sub-pixel 241, and the second sub-pixel 242 is provided with a first inactive display region 242b. As shown in FIG. 2A, the first direction is a vertical direction, and the second direction is a horizontal direction; a width of the first sub-pixel electrode 241a is approximately identical to that of the second sub-pixel electrode 242a in the horizontal direction, and a length of the first sub-pixel electrode 241a is larger than that of the second sub-pixel electrode 242a in the vertical direction, so that the first inactive display region 242b is formed from an end part of the second sub-pixel electrode 242a and the scan line adjacent to the second sub-pixel 242, as indicated by the dashed ellipse shown in FIG. 2A; in this case, the second sub-pixel electrode 242a and a second thin film transistor (TFT) are not provided in the first inactive display region 242b. The array substrate further includes a plurality of first signal lines 26 extending along the first direction and connected respectively with the touch sensing electrodes 25, and the first signal lines 26 are below the touch sensing electrodes 25 and insulated from the touch sensing electrodes 25 by an insulation layer. Since the first signal lines 26 are located at a layer different from the touch sensing electrodes 25, first bridging structures 27 are provided to electrically connect the first signal lines 26 with the touch sensing electrodes 25. As shown in FIGS. 2C and 2D, which respectively show a top view and a cross-sectional view of the first bridging structure 27 when the first signal lines 26 are below the touch sensing electrodes 25, the first bridging structure 27 includes at least a first via hole 272 exposing the touch sensing electrode 25, a second via hole 271 exposing the first signal line 26 and a first connection wiring 273 for connecting the touch sensing electrode 25 with the first signal line 26. The first connection wiring 273 is extended along the second direction. In some embodiments, for example, the first connection wiring 273 is extended along the horizontal direction. Alternatively, the first signal lines 26 are above the touch sensing electrodes 25, in this case, the top view and the cross-sectional view of the first bridging structure 27 are similar to those shown in FIGS. 2C and 2D, which is not repeatedly discussed herein.

In the case that the first signal lines 26 are above the data lines 23, in manufacturing, an insulation layer is formed above the data lines 23, and then a third metal layer is formed above the insulation layer and patterned to form the first signal lines 26.

Figure 2E:
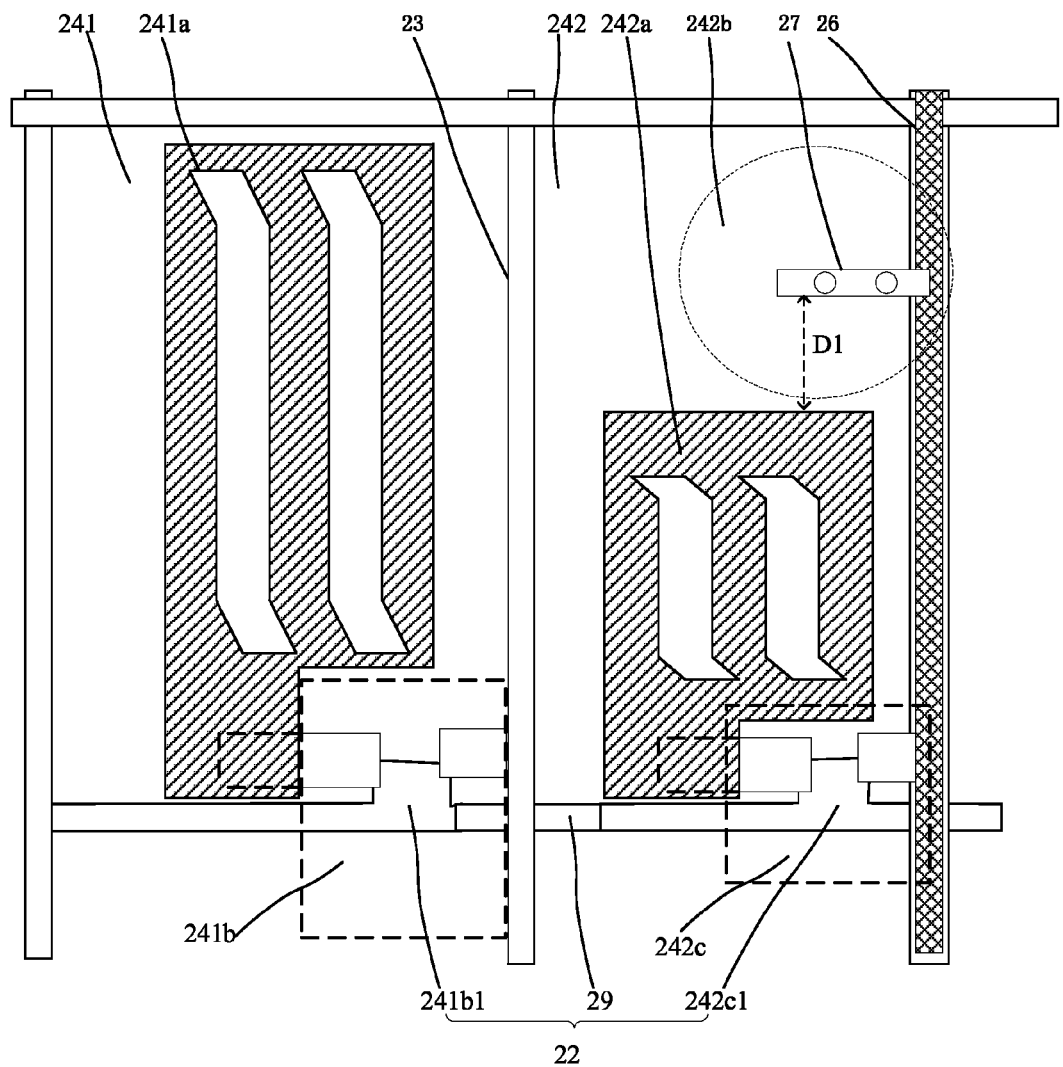
FIG. 2E is an enlarged schematic diagram showing the structure of a TFT device of the array substrate, according to embodiments of the disclosure.

In embodiments of the disclosure, in order to increase a distance between the bridging structure and the pixel electrode so as to ensure good electrical insulation between the bridging structure and the pixel electrode adjacent to the bridging structure and reduce a probability of short circuit, the first bridging structure 27 is disposed in the first inactive display region 242b. The first bridging structure 27 is disposed at the same layer as and made of the same material as the first sub-pixel electrode 241a and the second sub-pixel electrode 242a, and the first connection wiring 273 of the first bridging structure 27 is spaced from the end of the second sub-pixel electrode 242a by a first preset distance D1. As shown in FIGS. 2A and 2E, the first preset distance D1 between the first connection wiring 273 and the second sub-pixel electrode 242a in the first direction is larger than 1.5 µm and smaller than a half of the length of the first sub-pixel in the first direction, depending on a specific area of each sub-pixel. For example, in the case of the array substrate in a display panel with a high resolution, the first preset distance D1 is generally 1.5 µm to 15 µm. The first preset distance D1 is ideally 3 µm to 10 µm. For the array substrate in an array panel with an even higher resolution, the first preset distance D1 is 2 µm to 5 µm.

As shown in FIGS. 2A and 2D, the first connection wiring 273 of the first bridging structure 27 is spaced from the first sub-pixel electrode 241a adjacent to the first connection wiring 273 in the second direction by a third preset distance D3 in the second direction, in order to avoid the short circuit between the first connection wiring 273 and the adjacent first sub-pixel electrode 241a which are arranged at the same layer. The third preset distance D3 is larger than 1.5 µm and smaller than a half of the length of the first sub-pixel 241a in the first direction, depending on a specific area of each sub-pixel. For example, in the case of the array substrate in a display panel with a high resolution, the third preset distance D3 is generally 1.5 µm to 15 µm. The third preset distance D3 is ideally 3 µm to 8 µm. For the array substrate in an array panel with an even higher resolution, the first preset distance D1 is 2 µm to 4 µm.

In manufacturing the array substrate, an insulation layer (for example, which is made of silicon nitride or silicon oxide) or a passivation layer (for example, which is made of silicon nitride) is formed above the first signal lines 26, and a second transparent electrode layer (e.g. an ITO layer) is formed above the insulation layer or the passivation layer and etched to form the first sub-pixel electrodes 241a, the second sub-pixel electrodes 242a and the first connection wirings 273 by using the patterning process, where the first preset distance D1 is present between the first connection wiring 273 and an adjacent end of the second sub-pixel electrode 242a, and is sufficient to ensure the insulation between the first connection wiring 273 and the second sub-pixel electrode 242a, to reduce the probability of short circuit and improve yield. Further, the third preset distance D3 in the second direction is present between the first connection wiring 273 of the first bridging structure 27 and the first sub-pixel electrode 241a adjacent to the first connection wiring 273 in the second direction.

With reference to the above embodiments, as shown in FIG. 2E, the scan lines 22 are extended straight forward in the second direction, and each includes a first gate electrode 241b1 of a first TFT 241b (as indicated by the left dashed block shown in FIG. 2E) in the first sub-pixel 241, a second gate electrode 242c1 of a second TFT 242c (as indicated by the right dashed block shown in FIG. 2E) in the second sub-pixel 242 adjacent to the first sub-pixel 241 in the second direction, and a second connection wiring 29 connecting the first gate electrode 241b1 and the second gate electrode 241c1. In manufacturing the array substrate, after forming the first metal layer on the substrate 21, the first metal layer is etched to form the first gate electrode 241b1, the second gate electrode 242c1 and the second connection wiring 29 by using the patterning processes to form a pattern of the scan lines 22.

In order to avoid display effect degradation (such as a non-uniform display effect) due to arrangement of a plurality of the inactive display regions 242b along a straight line, at least three first inactive display regions 242b are misaligned in the present disclosure. In other words, connecting center points of a plurality of the first inactive display regions in sequence results in a polygonal line instead of a straight line. Therefore, at least three first bridging structures are misaligned because each first bridging structure is disposed in the first inactive display region, otherwise, if a plurality of the first bridging structures are distributed in a straight line, the display effect is degraded, causing for example a non-uniform display effect and a lowered display quality, because an effective display area of the second sub-pixel is smaller than that of the first sub-pixel adjacent to the second sub-pixel due to the presence of the first bridging structure.

In the disclosure, the first sub-pixel and the second sub-pixel are different from each other and provided in the array substrate, where the area of the second sub-pixel electrode in the second sub-pixel is smaller than that of the first sub-pixel electrode in the first sub-pixel, the first inactive display region is provided in the second sub-pixel (which includes the second sub-pixel electrode having a smaller area), and the first bridging structure for electrically connecting the touch sensing electrode with the first signal line is provided within the first inactive display region. In this way, the space between the bridging structure and the pixel electrodes is increased, which reduces the probability of short circuit, thereby achieving a higher solution of the display panel.

Figure 3A:
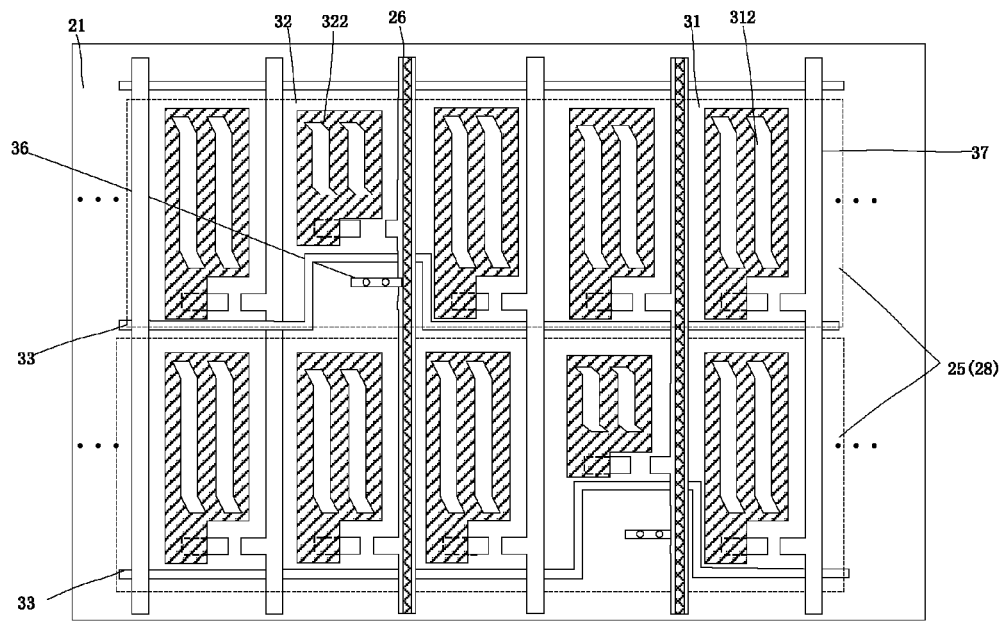
FIG. 3A is a schematic diagram showing the structure of an array substrate, according to embodiments of the disclosure.

As shown in FIG. 3A, embodiments include another implementation of the structure of the array substrate, based on the embodiments described above. In some embodiments, the scan line 33 in the has a bent structure, and a first bridging structure 36 is located within the second sub-pixel 32. The first bridging structure 36 is disposed at the same layer as the second pixel electrode 322 and at the same plane as the second pixel electrode 322, and the first bridging structure 36 is below the second pixel electrode 322 in the second direction, i.e. the vertical direction.

Figure 3B:
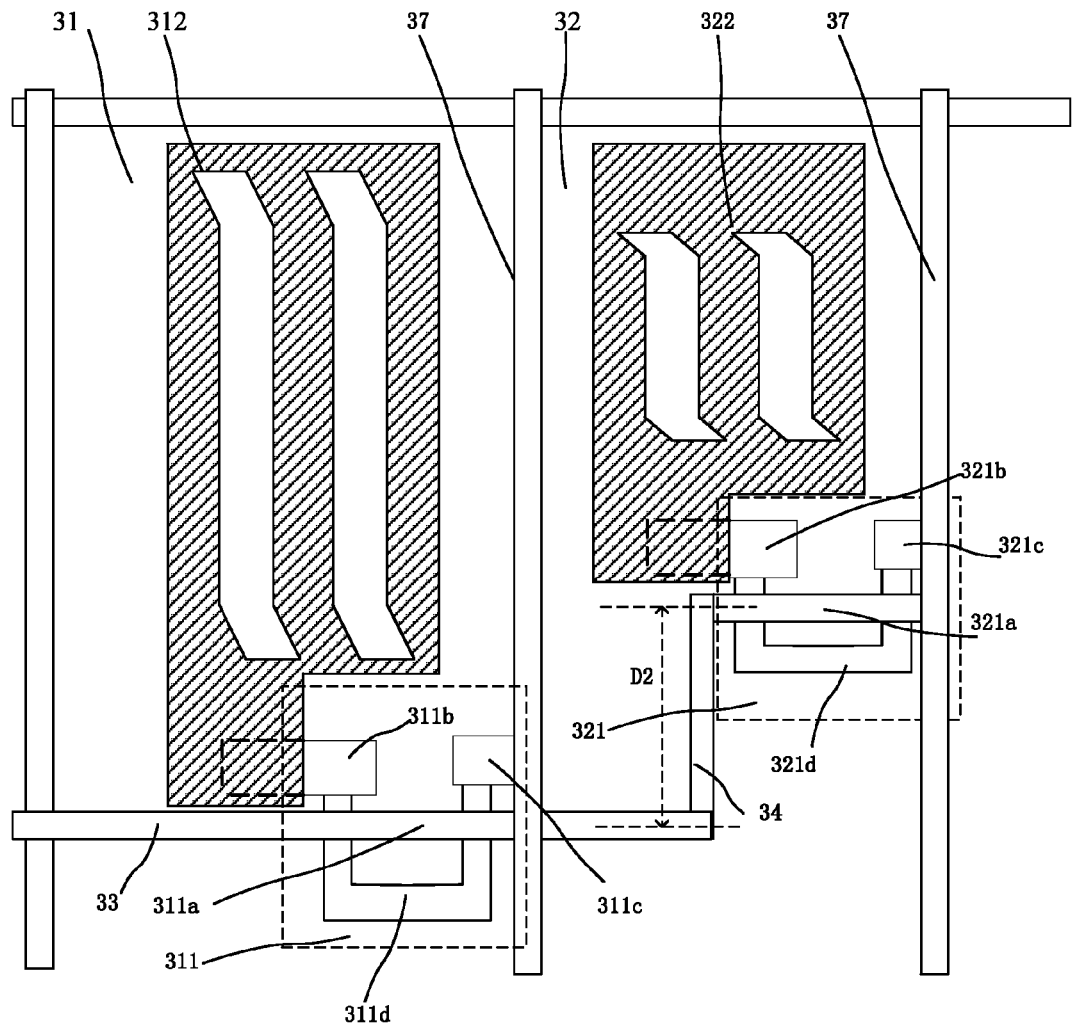
FIG. 3B is an enlarged schematic diagram showing the structure of a TFT device of the array substrate, according to embodiments of the disclosure.

As shown in FIG. 3B, the first sub-pixel 31 and the second sub-pixel 32 adjacent to each other in the second direction include a first TFT 311 and a second TFT 321, respectively. The first TFT 311 includes a first gate electrode 311a directly connected with a scan line 33, and the first gate electrode 311a and the scan line 33 can be obtained by patterning the same metal layer. The second TFT 321 includes a second gate electrode 321a, which is spaced from the first gate electrode 311a by a second distance D2 in the first direction, and the first gate electrode 311a and the second gate electrode 321a are electrically connected with each other by a second connection wiring 34 extending in the first direction. In some embodiments, in manufacturing the array substrate, the first gate electrode 311a, the second gate electrode 321a, the second connection wiring 34 and the scan line 34 are obtained by patterning the same metal layer, and are directly connected with each other and electrically connected. Additionally, the second preset distance D2 is 3 µm to 15 µm and can vary with a specific area of each sub-pixel. For the array substrate in a display panel with a high resolution, the second preset distance D2 is ideally 3 µm to 8 µm. For the array substrate in an array panel with an even higher resolution, the second preset distance D2 is 2 µm to 5 µm.

Figure 3C:
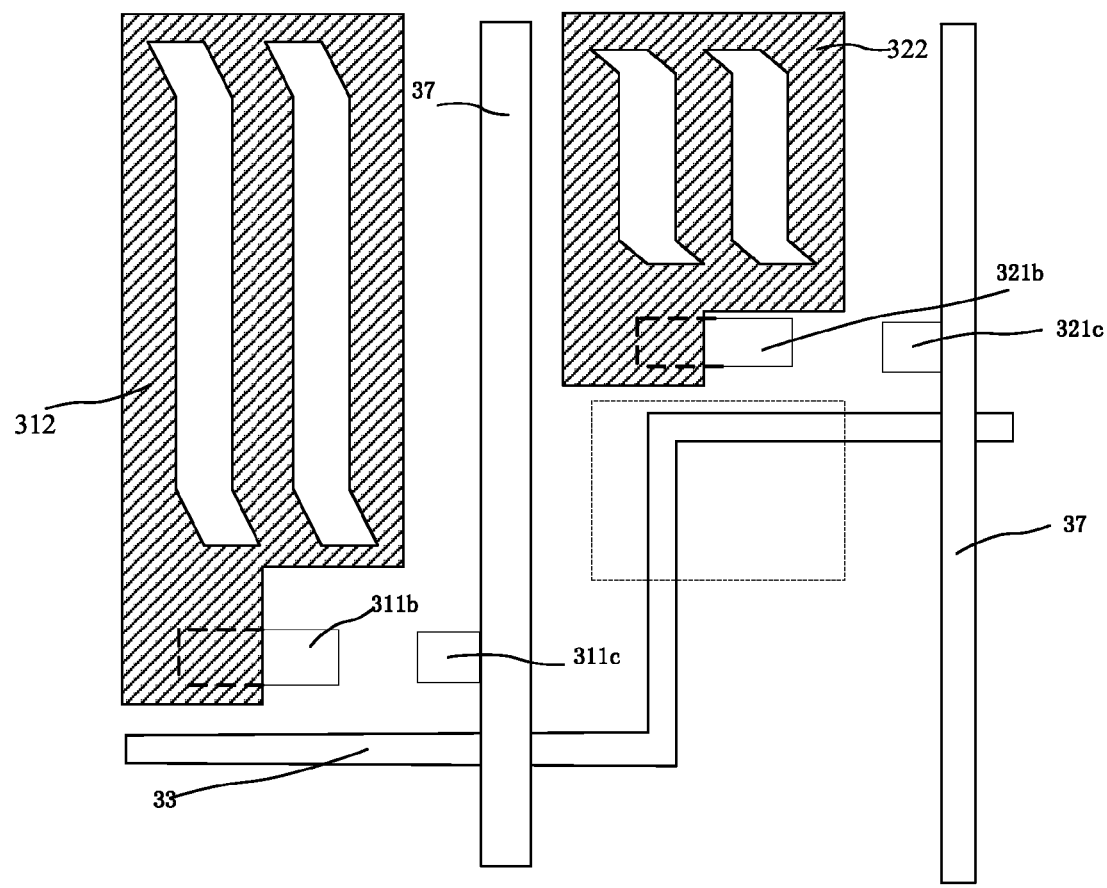
FIG. 3C is a schematic diagram showing the structure of scanning lines of the array substrate, according to embodiments of the disclosure.
Figure 3D:
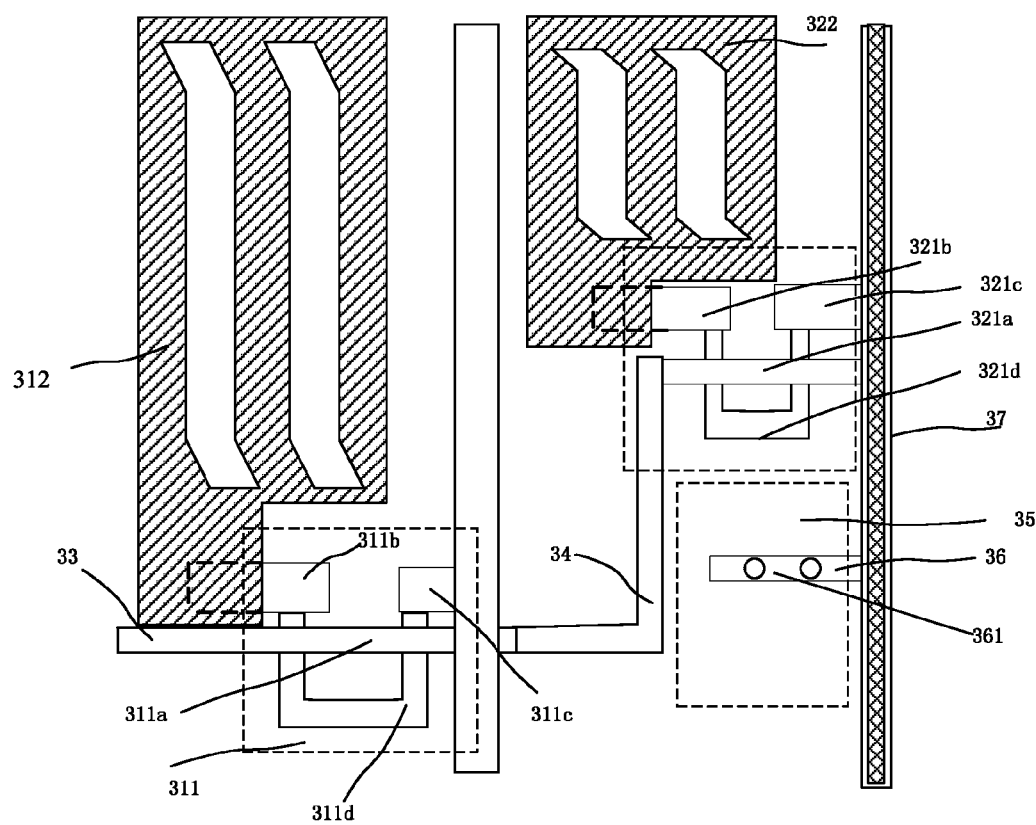
FIG. 3D is a schematic diagram showing the position of a first inactive display region in the array substrate, according to embodiments of the disclosure.

In the present disclosure, to increase a distance between the bridging structure and the pixel electrode so as to ensure electrical insulation between the bridging structure and the pixel electrode adjacent to the bridging structure and reduce a probability of short circuit there between, the manufactured scan line 33 has a bent structure within the region of the second sub-pixel 32, as indicated by a dashed block shown in FIG. 3C. In this case, the scan line 33 includes the first gate electrode 311 a, the second gate electrode 321a and the second connection wiring 34. Thus, a first inactive display region 35 is defined by intersecting the second gate electrode 321a with the second connection wiring 34 within the region of the second sub-pixel 32, as indicated by a dashed block shown in FIG. 3D. The first bridging structure 36 is disposed within the first inactive display region 35, and a width of a first connection wiring 361 of the first bridging structure 36 in the first direct is smaller than the second preset distance D2 between the first gate electrode 311a and the second gate electrode 321a.

Additionally, the first TFT 311 further includes a first drain electrode 311b electrically connected with the first sub-pixel electrode 312, a first source electrode 311c electrically connected with a data line 37, and polycrystalline silicon layer 311d. Similarly, the second TFT 321 also includes a second drain electrode 321b electrically connected with the second sub-pixel electrode 322, a second source electrode 321c electrically connected with a data line 37, and polycrystalline silicon layer 321d.

Also, in the present disclosure, the first sub-pixel and the second sub-pixel are different from each other and provided in the array substrate, where the area of the second sub-pixel electrode in the second sub-pixel is smaller than that of the first sub-pixel electrode in the first sub-pixel, the first inactive display region is arranged in the second sub-pixel (which includes the second sub-pixel electrode having a smaller area), i.e., the TFT in the second sub-pixel is relatively moved upwards so that the inactive display region is formed, and then the first bridging structure, which electrically connects the touch sensing electrode with the first signal line, is arranged within the first inactive display region. The embodiments can increase the space between the bridging structure and the pixel electrode, which reduces the probability of short circuit, thereby achieving a higher solution of the display panel.

Figure 4:
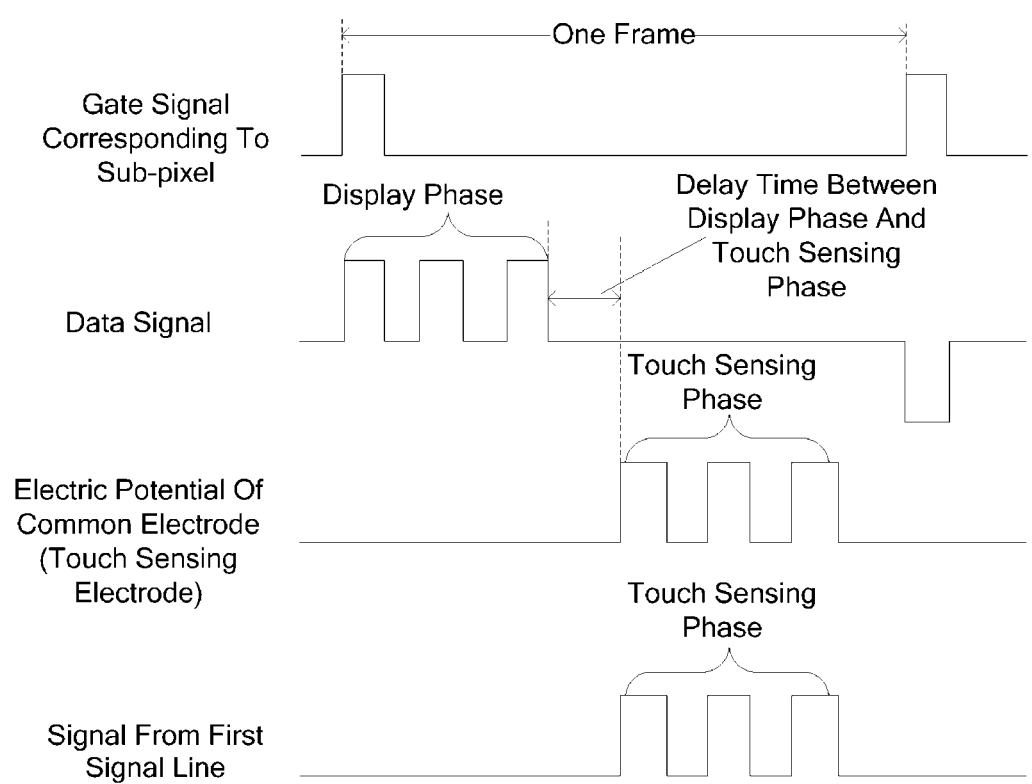
FIG. 4 is an operation timing diagram of processing signal data within one frame by the array substrate of any of the embodiments described above, according to embodiments described in the disclosure.

FIG. 4 is an operation timing diagram of processing signal data within one frame by the array substrate. Here, the TFT in each sub-pixel of the array substrate has an N-channel semiconductor (N-type) structure. In the beginning of the display phase, a gate electrode of each TFT is connected to a high electric potential (such as about 5V), the common electrode and all the first signal lines are connected to a low electric potential (such as 0V or −5V), and the touch mode is inactivated, then data signals are applied to the source electrodes of the TFTs by the data lines. During the display phase (which lasts for about 10 mm), the gate electrodes of the TFTs, the common electrode and the first signal lines all are connected to a low electric potential, so that the data signals are transmitted to the pixel electrodes, thereby controlling the display device to display the signals, meanwhile a plurality of the touch sensing electrodes are connected to the same electric potential.

In a touch sensing phase (which lasts for about 5 mm), the common electrode operates as touch sensing electrodes, each of which is connected to corresponding one of the first signal lines, where the first signal lines are configured to send touch signals (such as, pulse signals having a high level lasting for about 5 ns) to the touch sensing electrodes, and receive signals fed back by the touch sensing electrodes, thereby detecting a user touch operation and determining a touch position. There is a certain delay time between the display phase and the touch sensing phase.

The disclosure further provides a display panel, including the array substrate described above.

Figure 5:
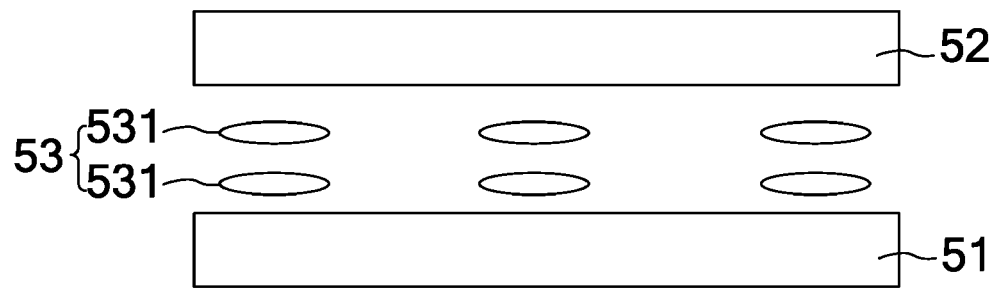
FIG. 5 is a sectional diagram showing the structure of a display panel, according to embodiments of the disclosure.

In some embodiments, the display panel is a Fringe Field Switching (FFS) mode display panel or an In-Plane Switching (IPS) mode display panel. As shown in FIG. 5, the display panel includes the array substrate 51 described above, and further includes a color filter substrate 52, and a liquid crystal layer 53 sandwiched between the color filter substrate 52 and the array substrate 51. The liquid crystal layer 53 includes liquid crystal molecules 531, which may be positive or negative liquid crystal molecules.

It is noted that the display panel described above has a touch sensing function. The technical principles employed and the technical effects achieved by the display panel are like those achieved by the above-described array substrate, which is not repeatedly discussed herein.

The present disclosure further provides a display device, including the display panel described above.

Figure 6:
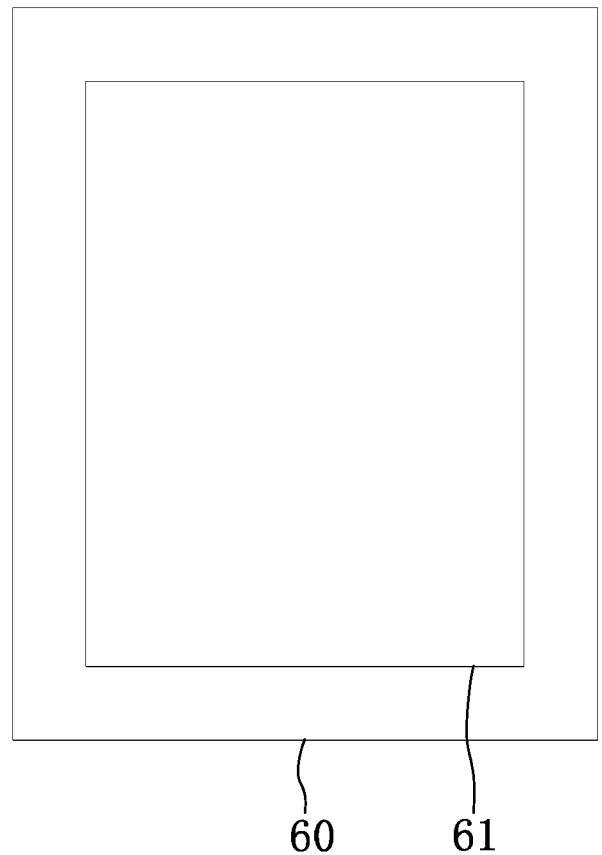
FIG. 6 is a schematic diagram showing the structure of a display device, according to embodiments of the disclosure.

As shown in FIG. 6, the display device 60 includes the above-described display panel 61, and further includes other elements for supporting the display panel 61 to work properly. The display panel 61 may be the display panel described in any of the above embodiments. The display device 60 may be a cellphone, a desktop computer, a laptop computer, a tablet computer, an electronic photo frame, electronic paper and so on.

The display device employs similar technical principles and achieves similar technical effects as the array substrate and the display panel in the above embodiments, which is not repeatedly discussed herein.

It should be noted that the above description describes embodiments and technical principles of the disclosure. Those skilled in this art will understand that the disclosure is not limited to the embodiments described herein, and various apparent changes, rearrangements and substitutions may be made by those skilled in this art without departing from the protecting scope of the disclosure. Therefore, although the disclosure has been described in detail as above in connection with the embodiments, the disclosure is not to limit thereto and may include other equivalent embodiments without departing from the conception of the disclosure Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

I claim:

1. An array substrate, comprising:
   a substrate;
   a plurality of scan lines and a plurality of data lines disposed on the substrate;
   a plurality of sub-pixels arranged in an array, which are defined by the data lines and the scan lines insulated intersecting with each other;
   a plurality of touch sensing electrodes disposed in an array, each of which corresponds to one pixel region comprising a plurality of first sub-pixels and at least one second sub-pixel; and
   a plurality of first signal lines extending along a first direction, with each of the touch sensing electrodes being electrically connected with at least one of the first signal lines by a first bridging structure disposed in a first inactive display region,
   wherein, an area of a second sub-pixel electrode in the second sub-pixel is smaller than that of a first sub-pixel electrode in the first sub-pixel, and the first inactive display region is provided in the second sub-pixel.

2. The array substrate of claim 1, wherein, a length of the first sub-pixel electrode is larger than that of the second sub-pixel electrode in the first direction; and a width of the first sub-pixel is the same as that of the second sub-pixel electrode in a second direction perpendicular to the first direction.

3. The array substrate of claim 2, wherein, the first bridging structure comprises at least a first via hole exposing the touch sensing electrode, a second via hole exposing the first signal lines and a first connection wiring for connecting the touch sensing electrode with the first signal line, and the first connection wiring is extended along the second direction.

4. The array substrate of claim 3, further comprising a third metal layer, a first transparent electrode layer covering the third metal layer, and a second transparent electrode layer covering the first transparent electrode layer, wherein the first signal lines are formed by patterning the third metal layer.

5. The array substrate of claim 4, wherein, the touch sensing electrodes are formed by patterning the first transparent electrode layer;
the first sub-pixel electrode and the second sub-pixel electrode are formed by the second transparent electrode layer; and
the first connection wiring is formed by the second transparent electrode layer, and is spaced from the second sub-pixel electrode by a first preset distance in the first direction.

6. The array substrate of claim 5, wherein the first preset distance is larger than 1.5 µm and smaller than a half of a length of the first sub-pixel electrode in the first direction.

7. The array substrate of claim 3, wherein, the first sub-pixel and the second sub-pixel adjacent to each other in the second direction comprise a first TFT and a second TFT, respectively;
wherein, a first gate electrode of the first TFT is extended along the second direction; a second gate electrode of the second TFT is extended along the second direction; and the first gate electrode is paced from the second gate electrode by a second preset distance in the first direction; and
the first gate electrode is electrically connected with the second gate electrode by a second connection wiring.

8. The array substrate of claim 7, further comprising a first metal layer covered by the third metal layer, wherein the first gate electrode, the second gate electrode and the second connection wiring are formed by patterning the first metal layer.

9. The array substrate of claim 8, wherein, the scan line comprises the first gate electrode, the second gate electrode and the second connection wiring; and the scan line has a bent structure in the second sub-pixel.

10. The array substrate of claim 9, wherein, the first inactive display region is defined by intersecting the second gate electrode with the second connection wiring in the second sub-pixel.

11. The array substrate of claim 10, wherein, the second sub-pixel electrode and the second TFT are not provided in the first inactive display region of the second sub-pixel.

12. The array substrate of claim 11, wherein, a width of the first connection wiring in the first direction is smaller than the second preset distance.

13. The array substrate of claim 3, wherein, the first sub-pixel and the second sub-pixel adjacent to each other and connected to the same scan line in the second direction comprise a first TFT and a second TFT, respectively;
wherein, a first gate electrode of the first TFT is extended along the second direction; a second gate electrode of the second TFT is extended along the second direction; and the first gate electrode is electrically connected with the second gate electrode via the second connection wiring; and the scan line comprises the first gate electrode, the second gate electrode and the second connection wiring; and
the scan line is extended straightly forwards in the second direction.

14. The array substrate of claim 13, wherein, the first inactive display region is formed from an end part of the second sub-pixel electrode to the scan line adjacent to the second sub-pixel in the first direction in the second sub-pixel.

15. The array substrate of claim 1, further comprising a common electrode comprising a plurality of touch sensing electrodes.

16. The array substrate of claim 13, wherein, when the array substrate being in a display phase, the plurality of touch sensing electrodes are connected to the same electric potential; and when the array substrate being in a touch sensing phase, each of the touch sensing electrodes is connected to a corresponding electric potential respectively.

17. The array substrate of claim 1, wherein, at least three first bridging structures are misaligned with the same straight line direction.

18. A display panel, comprising an array substrate,
wherein, the array substrate comprising a substrate;
a plurality of scan lines and a plurality of data lines disposed on the substrate;
a plurality of sub-pixels arranged in an array, which are defined by the data lines and the scan lines insulated intersecting with each other;
a plurality of touch sensing electrodes disposed in an array, each of which corresponds to one pixel region comprising a plurality of first sub-pixels and at least one second sub-pixel; and
a plurality of first signal lines extending along a first direction, with each of the touch sensing electrodes being electrically connected with at least one of the first signal lines by a first bridging structure disposed in a first inactive display region,
wherein, an area of a second sub-pixel electrode in the second sub-pixel is smaller than that of a first sub-pixel electrode in the first sub-pixel, and the first inactive display region is provided in the second sub-pixel.

19. The display panel of claim 18, wherein, a length of the first sub-pixel electrode is larger than that of the second sub-pixel electrode in the first direction; and a width of the first sub-pixel is the same as that of the second sub-pixel electrode in a second direction perpendicular to the first direction.

20. A display device, comprising a display panel having an array substrate,
wherein, the array substrate comprising a substrate;
a plurality of scan lines and a plurality of data lines disposed on the substrate;
a plurality of sub-pixels arranged in an array, which are defined by the data lines and the scan lines insulated intersecting with each other;
a plurality of touch sensing electrodes disposed in an array, each of which corresponds to one pixel region comprising a plurality of first sub-pixels and at least one second sub-pixel; and
a plurality of first signal lines extending along a first direction, with each of the touch sensing electrodes being electrically connected with at least one of the first signal lines by a first bridging structure disposed in a first inactive display region,
wherein, an area of a second sub-pixel electrode in the second sub-pixel is smaller than that of a first sub-pixel electrode in the first sub-pixel, and the first inactive display region is provided in the second sub-pixel.

* * * * *